United States Patent [19]

Kida et al.

[11] Patent Number: 5,344,801
[45] Date of Patent: Sep. 6, 1994

[54] HIGH ZIRCONIA FUSED CAST REFRACTORY

[75] Inventors: Otojiro Kida; Toshihiro Ishino, both of Yokohama, Japan

[73] Assignee: Asahi Glass Company Ltd., Tokyo, Japan

[21] Appl. No.: 69,692

[22] Filed: May 28, 1993

[30] Foreign Application Priority Data

Jun. 26, 1992 [JP] Japan ................................ 4-193088

[51] Int. Cl.$^5$ ............................................ C04B 35/48
[52] U.S. Cl. ..................................... 501/105; 501/103
[58] Field of Search ................................. 501/105, 103

[56] References Cited

U.S. PATENT DOCUMENTS

| | | | |
|---|---|---|---|
| 2,271,367 | 1/1942 | Fulcher et al. | 501/105 |
| 2,271,369 | 1/1942 | Fulcher et al. | 501/105 X |
| 3,632,359 | 1/1972 | Alper et al. | 501/105 X |
| 4,336,339 | 6/1982 | Okumiya et al. | 501/105 X |
| 4,705,763 | 11/1987 | Hayashi et al. | 501/105 X |
| 5,023,218 | 6/1991 | Zanoli et al. | 501/105 |
| 5,086,020 | 2/1992 | Ishino et al. | 501/105 |

FOREIGN PATENT DOCUMENTS

| | | |
|---|---|---|
| 0431445 | 12/1990 | European Pat. Off. . |
| 0403387 | 6/1991 | European Pat. Off. . |
| 2587025 | 3/1987 | France . |
| 55-3319 | 1/1980 | Japan . |
| 59-12619 | 3/1984 | Japan . |
| 1-100068 | 4/1989 | Japan . |
| 2-40018 | 9/1990 | Japan . |
| 3-28175 | 2/1991 | Japan . |
| 3-218980 | 9/1991 | Japan . |
| 1959995 | 6/1970 | United Kingdom . |

*Primary Examiner*—Karl Group
*Assistant Examiner*—David R. Sample
*Attorney, Agent, or Firm*—Oblon, Spivak, McClelland, Maier & Neustadt

[57] ABSTRACT

A high zirconia fused cast refractory which comprises from 90 to 95% by weight of $ZrO_2$, from 3.5 to 7% by weight of $SiO_2$, from 1.2 to 3% by weight of $Al_2O_3$ and from 0.1 to 0.35% by weight in a total amount of $Na_2O$ and/or $K_2O$, and which does not substantially contain any one of $P_2O_5$, $B_2O_3$ and CuO.

3 Claims, No Drawings

HIGH ZIRCONIA FUSED CAST REFRACTORY

BACKGROUND OF THE INVENTION

1. Field of the Invention

The present invention relates to a high zirconia fused cast refractory suitable for use as a refractory for a glass tank furnace.

2. Discussion of Background

Fused cast refractories are obtained by charging blended refractory materials into an electric arc furnace, completely melting them, then pouring the meltage into casting molds of prescribed shapes, followed by cooling to room temperature for solidification usually under thermal insulation. They are widely known as refractories which are dense and excellent in corrosion resistance and which are entirely different in the structure and the process for their preparation from fired or unfired bonded refractories.

Among such fused cast refractories, those containing a large amount of $ZrO_2$ exhibit particularly excellent corrosion resistance against molten glass. Therefore, zirconia fused cast refractories are widely used at the wall portions of a glass tank furnace which are in contact with molten glass.

It is known, however, that high zirconia fused cast refractories wherein the major structure is composed of $ZrO_2$ crystals (baddeleyite), undergo a reversible crystal phase transformation from monoclinic crystals to tetragonal crystals specific to $ZrO_2$ crystals, at about 1,100° C., and they undergo anisotropic volume expansion or shrinkage due to such a crystal phase transformation, whereby it is extremely difficult to obtain practically useful crack-free fused cast refractories of large sizes.

Heretofore, a variety of fused cast refractories containing 90% by weight or more of $ZrO_2$ and a matrix glass which is composed essentially of $SiO_2$ and which fills spaces among $ZrO_2$ crystals have been proposed. However, the main measure to prevent formation of cracks is a method of incorporating a component for softening the matrix glass to adjust the viscosity of the matrix glass, so that the strain due to the expansion or shrinkage of the $ZrO_2$ crystals within the temperature range for the crystal phase transformation of the $ZrO_2$ crystals, will be absorbed by the soft matrix glass, thereby to avoid formation of cracks.

For example, Japanese Examined Patent Publication No. 3319/1980 proposes to adjust the viscosity of a matrix glass by incorporation of a CuO or $B_2O_3$ component which softens the matrix glass which is composed mainly of $SiO_2$ and contains $Al_2O_3$. Here, the $Al_2O_3/SiO_2$ ratio (weight ratio, the same applies hereinafter) is specified to be less than 0.5, since if the $Al_2O_3/SiO_2$ ratio is 0.5 or higher, the matrix glass can not adequately be softened. Moreover, when a refractory containing a CuO component, is used for a wall of a glass tank furnace, there will be a problem of coloring glass. Accordingly, such a refractory is not suitable for a glass tank furnace for melting glass which is desired to be colorless, such as ordinary sheet glass.

Further, Japanese Examined Patent Publication No. 12619/1984 proposes to absorb the expansion and shrinkage of $ZrO_2$ crystals by softening a matrix glass which is composed mainly of $SiO_2$ and contains an $Al_2O_3$ component, by incorporating a $P_2O_5$ component to the matrix glass. In this case, a crack-free fused cast refractory can be obtained even without adjusting the $Al_2O_3/SiO_2$ ratio to a level of less than 0.5, and a refractory which is free from coloring glass and which is substantially free from forming stones (defects) in molten glass when used as a refractory for a wall of a glass tank furnace, can be obtained.

Japanese Examined Patent Publication No. 40018/1990 proposes a high zirconia fused cast refractory wherein the content of alkali metal oxides in the refractory is minimized to a level of not higher than 0.1% by weight to increase the electric resistivity within the service temperature range, and a $P_2O_5$ component and a $B_2O_3$ component are incorporated to soften the matrix glass and thereby to prevent cracking, so that the high zirconia fused cast refractory can be used for electrical glass melting.

Further, Japanese Unexamined Patent Publication No. 285173/1988 proposes to produce a fused cast refractory free from cracking and having a high electrical resistivity, by incorporating a $B_2O_3$ component and a component such as $K_2O$, $Rb_2O$, $Cs_2O$, SrO or BaO which is an oxide of an alkali metal or an alkaline earth metal having a relatively large ion radius, to a matrix glass which is composed mainly of $SiO_2$ and contains $Al_2O_3$.

Meanwhile, with high zirconia fused cast refractories, chipping off of the surface layer of the refractories (chipping off phenomenon) within a temperature range of from 400° to 600° C. during the temperature rise, has been pointed out as a problem, and Japanese Unexamined Patent Publication No. 100068/1989 proposes to limit the contents of the $P_2O_5$ component and the $B_2O_3$ component to obtain high zirconia fused cast refractories free from the chipping off phenomenon.

Further, Japanese Unexamined Patent Publications No. 218980/1991 and No. 28175/1991 propose to form a matrix glass which comprises $SiO_2$, $Al_2O_3$, $ZrO_2$ and $Na_2O$ components and which does not contain $P_2O_5$, $B_2O_3$ or CuO and to incorporate prescribed amounts of the $Al_2O_3$ component and the $Na_2O$ component, to obtain fused cast refractories free from cracking and at the same time to prevent the chipping off phenomenon by a decrease or a change in quality of the matrix glass due to precipitation of crystals of e.g. zircon ($ZrO_2 \cdot SiO_2$) in the matrix glass and to obtain fused cast refractories free from a tendency for an accumulation of remaining volume increase (having thermal cycle resistance).

By these proposals, it has been made possible to obtain refractories which have high thermal cycle resistance and high corrosion resistance against molten glass and which are free from contaminating molten glass and free from the chipping off phenomenon and have little blistering tendency (foam generating tendency). Such high zirconia fused cast refractories have now been widely used for glass tank furnaces. Further, high zirconia fused cast refractories having high electric resistivity suitable for electrical glass melting have recently been commercially available, and their applications are expected to expand to the field of special glass.

However, as a result of a creep test conducted under load at an elevated temperature using the high zirconia fused cast refractories proposed in Japanese Unexamined Patent Publications No. 218980/1991 and No. 28175/1991 as test samples and simulating the application to a wall of a glass tank furnace, a phenomenon has been observed wherein the matrix glass exudes from the refractory surface under load at an elevated temperature, and it has been deduced that when such refractories are practically used as refractories for a glass tank furnace under load at an elevated temperature for a long period of time, the molten glass will be contaminated by the glass exuded from the refractory surface, which causes formation of defects called codes in the glass product.

SUMMARY OF THE INVENTION

It is an object of the present invention to provide a high zirconia fused cast refractory of high quality which shows excellent corrosion resistance to molten glass, which is free from cracking to produce stones in molten glass or to color the glass, which is free from a chipping off phenomenon wherein the surface layer of the refractory falls off during the temperature rise, which shows no tendency for an accumulation of remaining volume increase and which is free from the matrix glass exudation under load at an elevated temperature.

The present invention has been made to solve the above-mentioned problems and provides a high zirconia fused cast refractory which comprises from 90 to 95% by weight of $ZrO_2$, from 3.5 to 7% by weight of $SiO_2$, from 1.2 to 3% by weight of $Al_2O_3$ and from 0.1 to 0.35% by weight in a total amount of $Na_2O$ and/or $K_2O$, and which does not substantially contain any one of $P_2O_5$, $B_2O_3$ and CuO.

DETAILED DESCRIPTION OF THE PREFERRED EMBODIMENTS

The high zirconia fused cast refractory of the present invention has a structure in which grain boundaries of relatively coarse baddeleyite crystals are filled with a matrix glass mainly composed of $SiO_2$, $Al_2O_3$ and $ZrO_2$ and contains a small amount of $Na_2O$ and/or $K_2O$ which provides a function of softening glass.

The high zirconia fused cast refractory of the present invention contains $Na_2O$ and/or $K_2O$ as a component to soften glass and adopts a composition which does not substantially contain any one of $P_2O_5$, $B_2O_3$ and CuO. Further, in the refractory of the present invention, the content of $Na_2O$ and/or $K_2O$ is limited to a range lower than the conventional range. Thus, the present inventors have succeeded in providing a fused cast refractory of high quality which is free from a chipping off phenomenon wherein the surface layer of the refractory falls off, which has good thermal cycle resistance without an accumulation of remaining volume increase and which is substantially free from exudation of the matrix glass from the surface of the refractory.

The larger the content of the $ZrO_2$ component in the refractory, the higher the corrosion resistance against molten glass. In this sense, the $ZrO_2$ component is at least 90% by weight. However, if the content of the $ZrO_2$ component exceeds 95% by weight, the proportion of the matrix glass in the refractory tends to be so small that cracking is likely to result, and it becomes difficult to obtain a fused cast refractory having no cracks by casting.

The $SiO_2$ component is an essential component for forming the matrix glass, and it is incorporated in an amount of at least 3.5% by weight so that the minimum amount of the matrix glass to avoid cracking is present in the refractory. However, if the content of the $SiO_2$ component is too large, the corrosion resistance of the refractory tends to deteriorate. Therefore, the content is at most 7% by weight, preferably at most 6% by weight.

The $Al_2O_3$ component plays an important role in adjusting the relation between the temperature and the viscosity of the matrix glass and provides an effect of reducing the concentration of the $ZrO_2$ component dissolved in the matrix glass. For example, when the $Al_2O_3$ content in the refractory is 0.9% by weight, several % by weight of $ZrO_2$ can be dissolved in the matrix glass. Whereas, in the refractory containing 2% by weight of $Al_2O_3$, $ZrO_2$ contained in the matrix will be not more than 2% by weight. By utilizing this effect of the $Al_2O_3$ component, it is possible to prevent precipitation of zircon in the matrix glass and to prevent the change in quality of the matrix glass, whereby it is possible to avoid the chipping off phenomenon of the refractory and cracking due to an accumulation of remaining volume increase.

The content of the $Al_2O_3$ component is at least 1.2% by weight in order to increase the viscosity of glass to a suitable degree to prevent the matrix glass exudation under load at an elevated temperature, and the content of the $Al_2O_3$ component is not more than 3% by weight, so that the viscosity of the matrix glass would not be too high.

The $Na_2O$ and $K_2O$ components are important components which influence the viscosity of the matrix glass and also have an effect of controlling the concentration of the $ZrO_2$ component to some extent. Therefore, it is important to adjust their contents. If the content of $Na_2O$ and/or $K_2O$ is less than 0.1% by weight in the total amount, the viscosity of the matrix glass tends to be high, and it becomes difficult to cast the refractory without cracking. On the other hand, if it exceeds 0.35% by weight, the matrix glass tends to be so soft that the glass is likely to exude from the surface of the refractory under load at an elevated temperature.

The $Al_2O_3$ content in the refractory is preferably from 1.2 to 2.5% by weight, whereby the resulting high zirconia fused cast refractory tends to scarcely undergo cracking, and the thermal cycle resistance and the prevention of the matrix glass exudation under load at an elevated temperature will further be improved.

The content of $Na_2O$ and/or $K_2O$ is preferably from 0.2 to 0.35% by weight in the total amount, whereby a refractory free from glass exudation from the surface of the refractory even under load at an elevated temperature, will be obtained, and it will be possible to cast a fused cast refractory of a large size without cracking with a high yield rate.

Thus, a preferred high zirconia fused cast refractory of the present invention comprises from 90 to 95% by weight of $ZrO_2$, from 3.5 to 6% by weight of $SiO_2$, from 1.2 to 2.5% by weight of $Al_2O_3$ and from 0.2 to 0.35% by weight in a total amount of $Na_2O$ and/or $K_2O$. By limiting the composition of the refractory to this preferred range, the viscosity of the matrix glass at about 1,100° C. will be optimized, and it is possible to constantly provide a high zirconia fused cast refractory free from problems such as cracking, accumulation of remaining volume increase, a chipping off phenomenon and the matrix glass exudation from the refractory.

The refractory of the present invention does not substantially contain any one of $P_2O_5$, $B_2O_3$ and CuO components. Namely, the content of any one of $P_2O_5$, $B_2O_3$ and CuO is less than 0.02% by weight, preferably less than 0.01% by weight. The small content of this level is meant by the term "does not substantially contain".

Accordingly, very small amounts of $P_2O_5$, $B_2O_3$ and CuO components which are usually contained as inevitable impurities in raw materials, will not, if introduced into the refractory, create any particular problem to the fused cast refractory of the present invention.

Further, $Fe_2O_3$ and $TiO_2$ components which are contained as impurities in the refractory will not create any problem so long as their total amount is not higher than 0.55% by weight, preferably not higher than 0.3% by weight.

Now, the high zirconia fused cast refractory of the present invention will be described in further detail with reference to Examples. However, it should be understood that the present invention is by no means restricted by such specific Examples.

EXAMPLES

Beneficiated (silica-removed) zircon (containing about 5% by weight of $SiO_2$) as $ZrO_2$ raw material, Bayer's alumina as $Al_2O_3$ raw material, silica sand as $SiO_2$ raw material and other raw material powders of e.g. $Na_2CO_3$ and $K_2CO_3$, were mixed to obtain a raw material mixture having a predetermined composition. This mixture was charged into a single phase AC electric arc furnace of 500 kVA equipped with graphite electrodes and completely melted at a temperature of from 2,200° to 2,400° C. This meltage was poured into a graphite mold having an internal capacity of 200 mm × 300 mm × 700 mm which was embedded in a Bayer's alumina powder and left to cool to a temperature around room temperature.

The chemical analytical values and measured properties of various fused cast refractories thereby obtained are shown in Tables 1 and 2. In Tables 1 and 2, No. 1 to No. 8 are Examples of the present invention, and No. 9 to No. 16 are Comparative Examples.

During the casting of these high zirconia fused cast refractories, parts of $Na_2O$, $K_2O$ and $SiO_2$ components sublimate and scatter. Accordingly, the contents of the $Na_2O$, $K_2O$ and $SiO_2$ components in the fused cast refractories obtained are low as compared with the contents in the composition of the initial raw material mixture.

To examine the matrix glass exudation under load at an elevated temperature with respect to the high zirconia fused cast refractories obtained, a columnar test specimen having a diameter of 30 mm and a height of 30 mm was cut out from each fused cast refractory, and using a load softening tester, it was heated to 1,500° C. and maintained at that temperature for 24 hours under a load of 2 kg/cm$^3$.

The amount of the matrix glass exuded from the refractory surface under load at an elevated temperature was represented by % obtained by dividing the volume increase of the test specimen caused by exudation of glass after the test by the volume of the test specimen before the test. Here, a test specimen having no glass exudation visually observed and with the volume increase being not more than 1%, was evaluated to be a good refractory free from the matrix glass exudation.

Evaluation of the thermal cycle resistance was conducted as follows. Namely, a test specimen of 40 mm × 40 mm × 30 mm was cut out from each fused cast refractory, and it was put in an electric furnace and heated from room temperature to 800° C. at a rate of 300° C./hr, then from 800° C. to 1,250° C. over a period of one hour and maintained at 1,250° C. for one hour. Then, it was cooled to 800° C. over a period of one hour and maintained at 800° C. for one hour. This thermal cycle between 800° C. and 1,250° C. was repeated 40 times and then the specimen was cooled to room temperature, whereupon a specimen showing no cracks and with the accumulation of volume increase being not higher than 3% was evaluated to be a good refractory.

The corrosion resistance index was determined in such a manner that a rectangular parallelopiped test specimen of 15 mm × 15 mm × 50 mm was cut out from each fused cast refractory and suspended in a platinum crucible having ordinary sheet glass melted therein at 1,500° C. for 48 hours, whereupon the corroded quantity (volume) of the test specimen was measured, and the corrosion resistance index was obtained by the following formula:

Corrosion resistance index = Corroded quantity (mm$^3$) of No. 9 test specimen/Corroded quantity (mm$^3$) of each test specimen No. 9 test specimen was a standard fused cast refractory commonly used for the conventional glass tank furnace.

The presence or absence of formation of stones or coloring of glass was evaluated by inspecting the glass remaining in the platinum crucible in the above corrosion resistance test.

TABLE 1

| | 1 | 2 | 3 | 4 | 5 | 6 | 7 | 8 |
|---|---|---|---|---|---|---|---|---|
| Chemical components (wt %) | | | | | | | | |
| $ZrO_2$ | 93.1 | 93.1 | 92.8 | 92.6 | 91.9 | 90.0 | 93.0 | 92.7 |
| $Al_2O_3$ | 1.2 | 1.2 | 1.7 | 2.5 | 3.0 | 2.4 | 1.3 | 1.4 |
| $SiO_2$ | 4.7 | 4.8 | 4.6 | 4.4 | 4.4 | 6.9 | 5.0 | 5.2 |
| $Na_2O$ | 0.1 | 0.2 | 0.3 | 0.3 | 0.35 | 0.3 | 0.15 | — |
| $K_2O$ | — | — | — | — | — | — | 0.15 | 0.3 |
| $P_2O_5$ | — | — | — | — | — | — | — | — |
| $B_2O_3$ | — | — | — | — | — | — | — | — |
| $Fe_2O_3 + TiO_2$ | <0.3 | <0.3 | <0.3 | <0.3 | <0.3 | <0.3 | <0.3 | <0.3 |
| $MgO + CuO$ | <0.1 | <0.1 | <0.1 | <0.1 | <0.1 | <0.1 | <0.1 | <0.1 |
| Bulk density | 5.30 | 5.30 | 5.31 | 5.29 | 5.24 | 5.05 | 5.30 | 5.27 |
| Compressive strength (kg/cm$^2$) | 4000 | — | 4000 | — | — | — | 4000 | — |
| Cracks | Nil | Nil | Nil | Nil | Nil | Nil | Nil | Nil |
| After thermal cycle test | | | | | | | | |
| Volume increase (%) | 3.0 | 1.0 | 0 | 0 | 3.0 | 2.8 | 1.0 | 1.0 |
| Cracking | Nil | Nil | Nil | Nil | Nil | Nil | Nil | Nil |
| Against sheet glass meltase | | | | | | | | |
| Corrosion resistance index | 2.15 | 2.18 | 2.18 | 2.20 | 2.15 | 1.80 | 2.20 | 2.15 |
| Formation of stones | Nil | Nil | Nil | Nil | Nil | Nil | Nil | Nil |
| Coloring of glass | Nil | Nil | Nil | Nil | Nil | Nil | Nil | Nil |
| Volume (%) of glass exudation under load | 0 | 0 | 0 | 0.7 | 0.8 | 0.5 | 0 | 0 |

TABLE 1-continued

|  | 1 | 2 | 3 | 4 | 5 | 6 | 7 | 8 |
|---|---|---|---|---|---|---|---|---|
| Glass exudation visually observed | Nil | Nil | Nil | Nil | Nil | Nil | Nil | Nil |

TABLE 2

|  | 9 | 10 | 11 | 12 | 13 | 14 | 15 | 16 |
|---|---|---|---|---|---|---|---|---|
| Chemical components (wt %) | | | | | | | | |
| $ZrO_2$ | 41.0 | 90.0 | 93.1 | 92.7 | 94.1 | 94.3 | 93.2 | 90.0 |
| $Al_2O_3$ | 46.0 | 2.5 | 1.1 | 1.5 | 1.2 | 1.2 | 1.5 | 3.3 |
| $SiO_2$ | 12.0 | 5.0 | 4.7 | 4.8 | 4.4 | 3.7 | 4.4 | 6.0 |
| $Na_2O$ | 0.8 | 0.5 | 0.7 | 0.6 | 0.05 | 0.4 | 0.3 | 0.35 |
| $P_2O_5$ | — | 1.5 | — | — | — | — | 0.05 | — |
| $B_2O_3$ | — | — | — | — | — | — | 0.1 | — |
| $Fe_2O_3 + TiO_2$ | <0.1 | <0.5 | <0.3 | <0.3 | <0.3 | <0.3 | <0.3 | <0.3 |
| $MgO + CuO$ | <0.1 | <0.5 | <0.1 | <0.1 | <0.1 | <0.1 | <0.1 | <0.1 |
| Rare earth oxides | — | 0.9 | — | — | — | — | — | — |
| Bulk density | 4.00 | 5.14 | 5.30 | 5.30 | 5.35 | 5.37 | 5.32 | 5.10 |
| Compressive strength (kg/cm$^2$) | 3500 | — | 4000 | — | — | — | — | — |
| Cracks | Nil | Present | Nil | Nil | Present | Nil | Nil | present |
| After thermal cycle test | | | | | | | | |
| Volume increase (%) | — | — | 2.5 | 2.0 | 7.0 | 3.0 | 10.0 | 6.0 |
| Cracking | — | — | Nil | Nil | Present | Present | Present | Present |
| Against sheet glass meltase | | | | | | | | |
| Corrosion resistance index | 1.0 | 1.25 | 2.15 | 2.18 | 2.00 | — | 2.15 | 1.80 |
| Formation of stones | Present | Present | Nil | Nil | Nil | Nil | Nil | Nil |
| Coloring of glass | Nil | Present | Nil | Nil | Nil | Nil | Nil | Nil |
| Volume (%) of glass exudation under load | 5.0 | — | 1.5 | 1.5 | 0 | 1.5 | 1.0 | 1.5 |
| Glass exudation visually observed | Present | — | Present | Present | Nil | Present | Nil | Present |

With the high zirconia fused cast refractory of the present invention, several problems characteristic to a high zirconia fused cast refractory are solved simultaneously. As a result, a fused cast refractory of high quality is obtained. Namely, cracking caused by the volume change due to the crystal phase transformation of $ZrO_2$ crystals is avoided by a conventional technique i.e. by forming a soft matrix glass in the refractory.

The chipping off phenomenon is avoided by limiting the contents of $Al_2O_3$ and $Na_2O$ and/or $K_2O$ in the refractory to reduce the $ZrO_2$ component dissolved in the matrix glass so as to avoid the change in quality which occurs when the $ZrO_2$ component dissolved in the matrix glass is converted to zircon ($ZrO_2 \cdot SiO_2$ crystals) and precipitates in the matrix glass.

Further, this measure is believed to be effective also to prevent cracking due to an accumulation of volume increase. Namely, the thermal cycle resistance is improved by avoiding such a phenomenon that zircon precipitates and the amount of the matrix glass decreases leading to a quality change, whereby the viscosity of the matrix glass departs from a proper range, so that the matrix glass can no longer follow the expansion and shrinkage of the baddeleyite.

The matrix glass exudation from the refractory under load at an elevated temperature is prevented by limiting the contents of $Al_2O_3$ and $Na_2O$ and/or $K_2O$ components in the refractory to the above-mentioned proper range to maintain the viscosity of the matrix glass at a level higher than a predetermined viscosity.

Thus, as compared with conventional high zirconia fused cast refractories, the high zirconia fused cast refractory of the present invention is not only excellent in the corrosion resistance but also substantially free from a chipping off phenomenon wherein the surface layer partially falls off during the temperature rise, remarkably superior in the thermal cycle resistance and free from the matrix glass exudation under load at an elevated temperature.

Therefore, when the fused cast refractory of the present invention is used for a glass tank furnace, the refractory is substantially free from cracking, and it is accordingly possible to avoid the possibility that fine chipped particles of refractory are freed into the glass meltage from the cracked portions of the refractory, and it is free from the matrix glass exudation under load at an elevated temperature, whereby there will be no contamination of the glass meltage.

When the high zirconia fused cast refractory of the present invention is used for a glass tank furnace, the durability and reliability of the glass tank furnace will increase, and the yield rate and the quality of the glass product thereby produced will remarkably be improved. Therefore, it is useful as a refractory for a furnace for melting a glass composition having a high melting point or for a glass tank furnace for production of fine glass products such as electronic glass substrates or display glass substrates for which high quality is required. In view of such effects that the quality and the yield rate of these glass products are improved, the merit of the refractory of the present invention for industrial application is substantial.

What is claimed is:

1. A high zirconia fused cast refractory which comprises from 90 to 95% by weight of $ZrO_2$, from 3.5 to 7% by weight of $SiO_2$, from 1.2 to 3% by weight of $Al_2O_3$ and from 0.1 to 0.35% by weight in a total amount of $Na_2O$ and/or $K_2O$ and wherein each of $P_2O_5$, $B_2O_3$ and CuO which are contained in the refractory as inevitable impurities, is less than 0.02% by weight.

2. The high zirconia fused cast refractory according to claim 1, which contains from 0.1 to 0.35% by weight of $Na_2O$.

3. The high zirconia fused cast refractory according to claim 1, which contains from 3.5 to 6% by weight of $SiO_2$, from 1.2 to 2.5% by weight of $Al_2O_3$ and from 0.2 to 0.35% by weight in a total amount of $Na_2O$ and/or $K_2O$.

* * * * *